US009979730B2

(12) United States Patent
Wong et al.

(10) Patent No.: US 9,979,730 B2
(45) Date of Patent: May 22, 2018

(54) SYSTEM AND METHOD FOR SECURE PROVISIONING OF OUT-OF-NETWORK USER EQUIPMENT

(71) Applicant: Futurewei Technologies, Inc., Plano, TX (US)

(72) Inventors: Marcus Wong, Greenbrook, NJ (US); Zhibi Wang, Woodridge, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 241 days.

(21) Appl. No.: 14/928,901

(22) Filed: Oct. 30, 2015

(65) Prior Publication Data

US 2017/0126682 A1    May 4, 2017

(51) Int. Cl.
*H04L 29/06* (2006.01)
(52) U.S. Cl.
CPC .......... *H04L 63/10* (2013.01); *H04L 63/0281* (2013.01); *H04L 63/06* (2013.01); *H04L 63/08* (2013.01)
(58) Field of Classification Search
CPC ..... H04L 63/10; H04L 63/0281; H04L 63/06; H04L 63/08
See application file for complete search history.

(56) References Cited

U.S. PATENT DOCUMENTS 8,191,116 B1 * 5/2012 Gazzard .................. H04L 63/08 726/10
8,335,490 B2 * 12/2012 Kaippallimalil ........ H04L 63/08 380/278
9,357,386 B2 * 5/2016 McCann ............... H04W 12/06
9,736,686 B2 * 8/2017 Wifvesson ............ H04W 12/04
(Continued)

FOREIGN PATENT DOCUMENTS

| CN | 105009610 A | 10/2015 |
|---|---|---|
| WO | 2015171750 A | 11/2015 |
| WO | 2016039579 A | 3/2016 |

OTHER PUBLICATIONS

PCT/CN2016/103410, ISR, dated Feb. 4, 2017.

*Primary Examiner* — Beemnet Dada
*Assistant Examiner* — Stephen Gundry
(74) *Attorney, Agent, or Firm* — Vierra Magen Marcus LLP

(57) ABSTRACT

The disclosure relates to technology for provisioning out-of-network user equipment with a network relay in a communications network. The network relay device receives an authentication key request message from user equipment including a user equipment identity and an authentication server identity, and communicates the authentication key request message to an authentication server having the authentication server identity. The network relay device communicates a relay authentication key response received from the authentication server to the user equipment such that a secure communication is established between the user equipment and the network. A relay authentication key is generated during establishment of the secure communication between the user equipment and authentication server, and a session with the user equipment is authenticated using a session key generated by the user equipment based on the relay authentication key. The user equipment is the authenticated with the network relay device and provisioned.

21 Claims, 8 Drawing Sheets

(56) References Cited

U.S. PATENT DOCUMENTS

| | | | |
|---|---|---|---|
| 2005/0097363 A1* | 5/2005 | Bajko | H04L 63/205 726/4 |
| 2006/0019635 A1* | 1/2006 | Ollila | H04L 63/08 455/411 |
| 2008/0016230 A1* | 1/2008 | Holtmanns | H04L 63/08 709/229 |
| 2008/0301785 A1* | 12/2008 | Beyer | H04L 63/08 726/5 |
| 2009/0055899 A1* | 2/2009 | Deshpande | H04L 65/1069 726/4 |
| 2010/0235890 A1* | 9/2010 | Cakulev | H04W 12/06 726/5 |
| 2010/0318670 A1* | 12/2010 | Al-Shalash | H04W 76/02 709/229 |
| 2011/0185397 A1* | 7/2011 | Escott | H04B 7/155 726/3 |
| 2011/0305339 A1* | 12/2011 | Norrman | H04W 12/04 380/270 |
| 2013/0097674 A1* | 4/2013 | Jindal | H04L 63/0876 726/4 |
| 2013/0250849 A1* | 9/2013 | Li | H04W 4/18 370/328 |
| 2013/0265869 A1* | 10/2013 | Zhang | H04L 47/36 370/229 |
| 2014/0133332 A1 | 5/2014 | Lee | |
| 2014/0148142 A1 | 5/2014 | Hakola et al. | |
| 2014/0198714 A1* | 7/2014 | M | H04L 5/0091 370/315 |
| 2014/0204864 A1* | 7/2014 | M | H04W 76/022 370/329 |
| 2014/0223538 A1* | 8/2014 | Van De Velde | H04L 12/2867 726/12 |
| 2014/0281541 A1* | 9/2014 | Cherian | H04W 12/06 713/169 |
| 2015/0029866 A1 | 1/2015 | Liao et al. | |
| 2015/0249999 A1* | 9/2015 | Kaippallimalil | H04W 24/08 370/329 |
| 2015/0326302 A1* | 11/2015 | Stojanovski | H04B 7/155 370/315 |
| 2015/0382159 A1* | 12/2015 | Kim | H04W 4/08 370/312 |
| 2016/0205555 A1* | 7/2016 | Agiwal | H04W 12/04 713/168 |
| 2016/0345169 A1* | 11/2016 | Wifvesson | H04W 12/04 |
| 2017/0093541 A1* | 3/2017 | Pan | H04L 5/0048 |

* cited by examiner

SYSTEM AND METHOD FOR SECURE PROVISIONING OF OUT-OF-NETWORK USER EQUIPMENT

BACKGROUND $3^{rd}$ Generation Partnership Project 3GPP is a collaboration between groups of telecommunications associations that have joined to define globally applicable third-generation (3G) mobile phone system specifications (e.g., within the scope of the International Mobile Telecommunications-2000 project of the International Telecommunication Union (ITU)) based on evolved Global System for Mobile Communications (GSM) specifications and encompassing radio, core network and service architecture. Among several other standards within 3GPP, Long Term Evolution (LTE) is a standard within the mobile network technology arena.

In the evolution of LTE-compliant networks, relay nodes are being deployed to help extend network coverage to user equipment and to improve cell-edge bandwidth. Unlike other network devices, such as evolved nodeBs (eNB), Mobility Management Entity (MME), etc., which operate under the control of operator-controlled physical locations, relay nodes tend to be placed closer to the user equipment in physically more accessible or vulnerable locations and operate more independently. As a result, relay nodes are prone to certain new security threats and attacks (e.g., man-in-the-middle attacks, relay node impersonations attacks, etc.) that are not present in other network devices such as eNB or MME. Moreover, relay nodes are often utilized to promote communication between user equipment and the network devices.

BRIEF SUMMARY

In one embodiment, there is a method for provisioning out-of-network user equipment, including a network relay device receiving an authentication key request message from a user equipment including a user equipment identity and an authentication server identity, and communicating the authentication key request message to an authentication server having the authentication server identity; the network relay device communicating a relay authentication key response received from the authentication server to the user equipment such that a secure communication is established between the user equipment and the network; the network relay device receiving a relay authentication key generated during establishment of the secure communication between the user equipment and authentication server; and the network relay device authenticating a session with the user equipment using a session key generated by the user equipment based on the relay authentication key and provisioning the user equipment based on the authenticated session.

In another embodiment, there is a network relay device, including a receiver receiving an authentication key request message from a user equipment including a user equipment identity and an authentication server identity, and communicating the authentication key request message to an authentication server having the authentication server identity; a transmitter communicating a relay authentication key response received from the authentication server to the user equipment such that a secure communication is established between the user equipment and the network; the receiver receiving a relay authentication key generated during establishment of the secure communication between the user equipment and authentication server; and a processor operatively coupled to the transmitter and to the receiver and including a non-transitory computer-readable storage device comprising instructions which cause the processor to authenticate a session with the user equipment using a session key generated by the user equipment based on the relay authentication key and provisioning the user equipment based on the authenticated session.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

The present disclosure, generally described, relates to secure provisioning of out-of-network user equipment (UE). The out-of-network user equipment UE is able to establish a secure connection to a network relay based on a pre-shared secret without having to pre-provision the user equipment UE with the identity(ies) of the network relay(s) and the security parameters of the network relay(s). The solution is based on existing credentials between the user equipment UE and the network, such that the user equipment UE can establish a secure end-to-end communication with the authentication server (AS) in the network via the network relay(s). In particular, the unauthenticated user equipment UE communicates with the network relay(s) and establishes a connection with the authentication server AS. The network relay(s) essentially acts as an IP router that limits the traffic (communication) between the unauthenticated user equipment UE and authentication server AS until the user equipment UE is provisioned and establishes a secure communication with network relay(s). Once the secure communication is established, the network relay(s) grants the user equipment UE full access (limited communication removed) to the network. The term relay, network relay, relay device and relay node as used in this document is non-limiting and may be any device capable of relaying traffic in the network, such as an IP router, user equipment or any other network device with relay capabilities. Thus, while exemplary embodiments describe a user equipment-to-network relay, other embodiments, such as user equipment-to-user equipment may also be utilized, along with any other D2D configuration.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
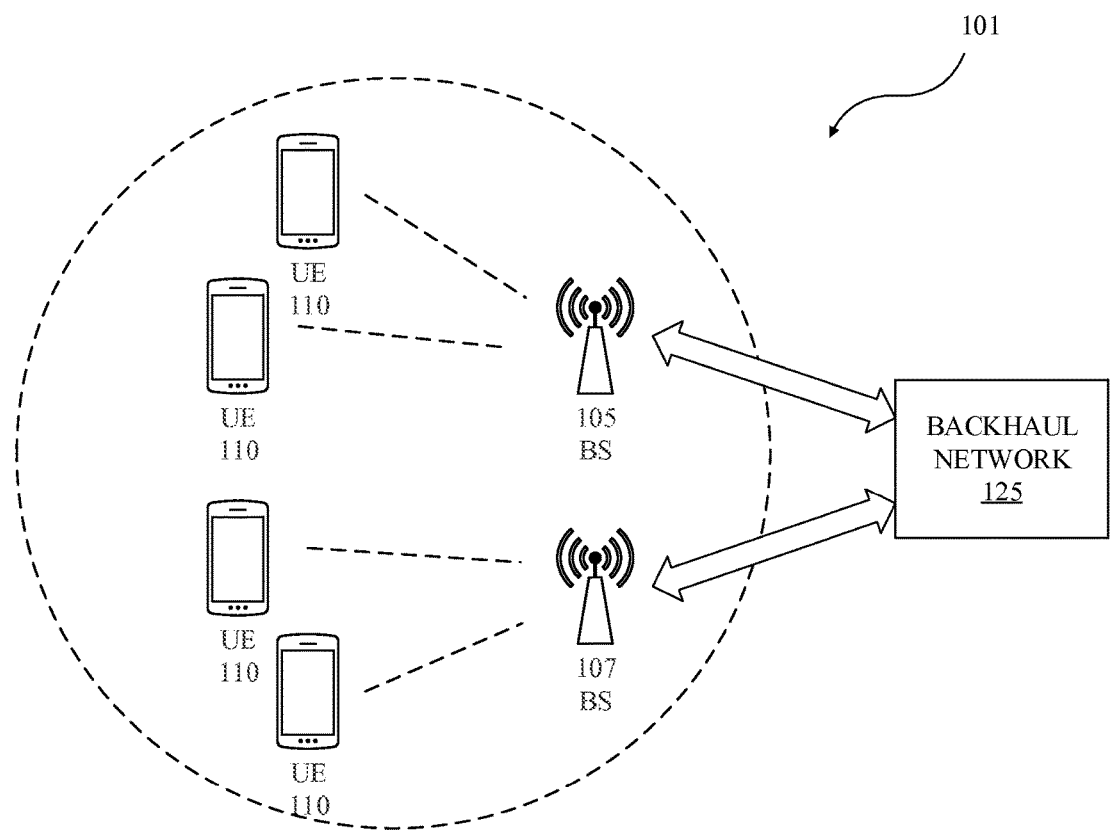
FIG. 1 illustrates an exemplary wireless network for communicating data.

FIG. 1 illustrates an exemplary wireless network for communicating data. Network 100 includes communications controllers 105, 107 having a coverage area (dashed circle), a plurality of user equipment UE 110, and backhaul network 125. Although four user equipments (UEs) are depicted, it is appreciated that the illustration is non-limiting in the number that may be provided. Communications controllers 105, 107 may be any component capable of providing wireless access by establishing uplink (UL) and/or downlink (DL) connections with user equipment UE 110, such as a base station (BS), a NodeB, an eNB, an access point, a picocell, a femtocell, and other wirelessly enabled devices. There may also be D2D communication between one user equipment UE 110 and one or more other user equipment UE 110. The user equipment UE 110 may be any component capable of establishing a wireless connection with communications controllers 105, 107, such as cell phones, smart phones, tablets, sensors, etc. Backhaul network 125 may be any component or collection of components that allow data to be exchanged between communications controller 102 and a remote end. In some embodiments, the network 100 may include various other wireless devices, such as relays and other network devices.

Examples of a wireless network that can implement the present techniques and systems include, among others, wireless communication systems based on Code division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX). It is appreciated that the illustrated embodiment is non-limiting, and that any number of various wireless devices and telecommunication systems may be employed, as readily appreciated to the skilled artisan.

Figure 2:
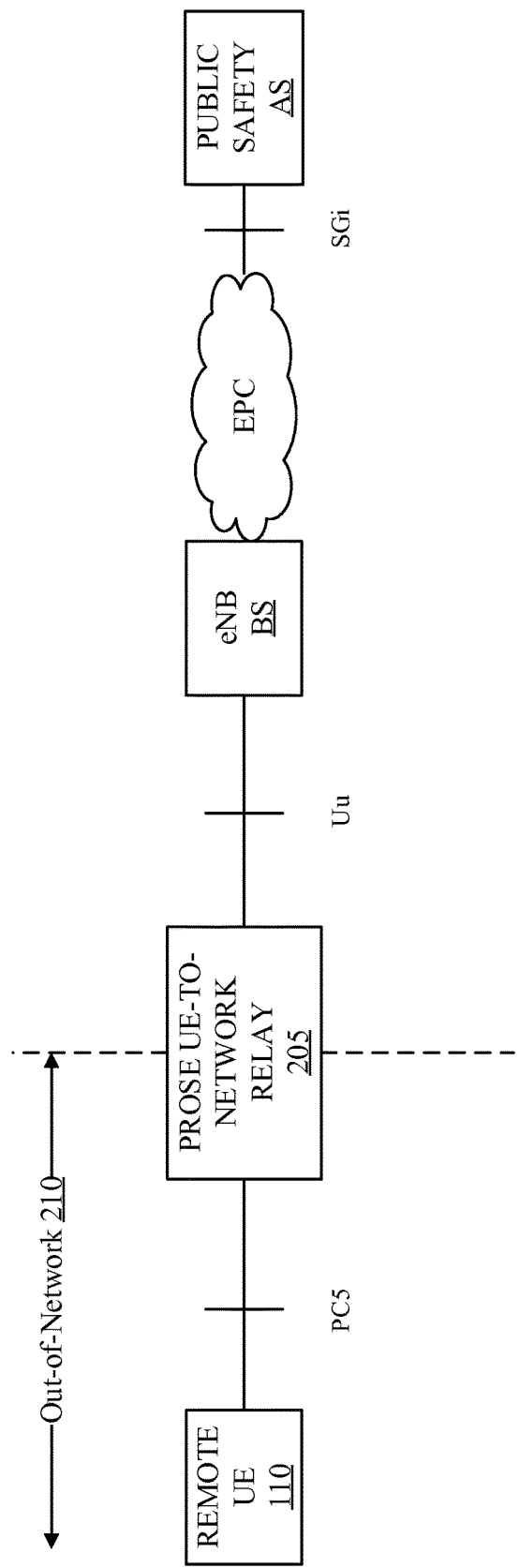
FIG. 2 illustrates an exemplary wireless communication network architecture supported network relay.

FIG. 2 illustrates an exemplary wireless communication network architecture supported network relay. The wireless communication network architecture of FIG. 2 includes, for example, a remote user equipment UE 110 (also referred to herein as user equipment UE), a Proximity Service (ProSe) network relay 205 (or relay capable network device), an evolved Node B (such as a base station BS), an evolved packet core EPC and a public safety authentication sever AS. The ProSe UE-to-network relay function includes support for the relay of unicast traffic (UL and DL) between remote user equipment UE 110 that are not served by E-UTRAN and the network.

The ProSe UE-to-network relay 205 (also referred to herein as a network relay or relay) provides a generic forwarding function that can relay any type of IP traffic that is relevant for public safety communication. The one-to-one communication between user equipment UE 110 and network relay 205 is well-known, and not described herein.

The network relay 205 uses the uplink traffic flow templates (TFTs) to select the uplink EPS bearers for relayed uplink packets independently from the ProSe per pocket priority applied over a standard interface, such as a PC5 interface in 3GPP. The network relay 205 maps the evolved packet system (EPS) bearer's QoS Class Identifier (QCI) into a ProSe per packet priority value to be applied for the downlink relayed unicast packets over the interface. The mapping rules are configured in the network relay 205.

Under current 3GPP provisions, the proximity service supports a user equipment UE to network relay mode. However, under these current provisions, the user equipment UE 110 obtains the proximity service via network relay 205 after the user equipment UE 110 and network relay 205 establishes a secure communication, where the user equipment UE 110 and network relay 205 have pre-provisioned shared secrets (keys) to establish the secure communication. For example, various solutions exist in 3GPP to establish the secure communication. A first solution requires the user equipment UE 110 to be provisioned with different relay group keys. When connecting to a particular network relay 205, the user equipment UE 110 tells the network relay 205 to use a specific group, and the network relay 205 fetches the identified group key from the network.

Another solution requires the user equipment UE 110 to be provisioned with the network relay key. When connecting to the network relay 205, the user equipment UE 110 informs the network relay 205 to use a particular key, and the network relay 205 fetches the key from the network.

Still another solution requires the network relay 205 to send an encrypted key to the user equipment UE 110. When connecting to the network relay 205, the network relay 205 requests a relay key from network. The network sends the relay key plus the relay key encrypted by the user equipment UE 110 credential to the network relay 205. The network relay 205 then ends the relay key encrypted to the user equipment UE 110, and the user equipment UE 110 recovers the relay key.

As appreciated, in in-network coverage areas, the user equipment UE 110, may transmit and receive messages to the eNB (BS). In out-of-network coverage area 210, on the other hand, the user equipment UE 110 cannot communicate with eNB (BS). Other examples include a partial coverage area or edge of network (not illustrated), in which the user equipment UE 110 can receive messages from eNB (BS) but cannot transmit messages to eNB (BS). In another example, two or more user equipment UE 110 are performing D2D communication, in which one user equipment UE 110 is located in-network coverage and the other user equipment UE 110 is located in an out-of-network coverage or has partial coverage. Thus, one user equipment UE 110 may act as a relay for the other user equipment UE 110.

The call flow for existing 3GPP architectures (not illustrated) follows. When a ProSe User Relay authentication key (PRUK) is not recognized at the authentication server AS (e.g., the authentication server AS, such as a PKMF, fails to recognize the PRUK ID coming via the network relay 205, and the user equipment UE 110 is out of coverage, the user equipment UE 110 cannot fetch a new PRUK from the authentication server AS. In this case, the user equipment UE 110 contacts the network relay 205 with a user equipment UE 110 identity (UE ID), as follows.

The user equipment UE 110 fetches the PRUK and the associated PRUK ID from the authentication server AS. The user equipment UE 110 fetches the PRUK while in network coverage. The user equipment UE 110 then discovers the network relay 205 and the network relay ID. Following discovery, the user equipment UE 110 sends a direct communication request message to the network relay 205, including a PRUK ID, Nonce_1 (a random number) and a DKSI (provides the values of the Key Set Identifier for a security context created from the PRUK). It also calculates the ProSe Relay Key PRK using the PRUK and the network relay ID. The network relay 205 then sends the received PRUK ID and network relay ID to the authentication server AS.

If the authentication server AS does not recognize the PRUK ID, it sends an error message to the network relay 205 indicating that the PRUK ID is unknown. The network relay 205 then conveys the message to the user equipment UE 110. When the user equipment UE 110 receives the error message, it attempts to fetch a new PRUK from the authentication server AS. If the attempt is successful, the user equipment UE 110 starts over from the direct communication request with the new PRUK ID. If fetching a new PRUK is not successful (e.g. the user equipment UE is out of coverage), the user equipment UE 110 sends the direct communication request with the UE identity, e.g. IMSI instead of the PRUK ID. The message may also include Nonce_1 and DKSI.

The network relay 205 sends a message to get a relay authentication key to the authentication server AS with the UE ID, e.g. IMSI. When the authentication server AS receives the relay authentication key, it checks if the network relay 205 is authorized to serve the user equipment UE 110 (which is identified by the ProSe UE ID), and fetches the GPI and Ks_ext/int_NAF from the BSF using the UE ID, e.g. IMSI as the identity or an identity mapped to UE identity, e.g. IMSI. The PRK is then calculated by the authentication server AS using Ks_ext/int_NAF with the network relay ID as input. Subsequently, the authentication server AS sends the PRK and GPI to the network relay 205, and the network relay 205 generates Nonce_2 (a random number), calculates $K_{D\text{-}SESS}$ (the key that will be used to protect this one-to-one communication session). ($K_{D\text{-}SESS}$ is calculated using PRK as the key and Nonce_1 and Nonce_2 as inputs).

The network relay 205 then sends a direct security mode command message to the user equipment UE 110, including the DKSI to indicate the security context used to protect the message, namely GPI and Nonce_2. The message is integrity protected with an integrity key from the KD-SESS. The user equipment UE 110 then retrieves the Nonce_2 from the direct security mode command message, calculates Ks_ext/int_NAF from GPI, then calculates PRK using Ks_ext/int_NAF and the network relay ID. Then, the user equipment UE 110 calculates the KD-SESS from PRK, Nonce_1 and Nonce_2, and checks the integrity protection of the received message using the integrity algorithm indicated in the messages and integrity key generated from the KD-SESS. Finally, the user equipment UE_1 responds to UE_2 (relay) with a direct security mode complete message which is integrity protected.

Figure 3:
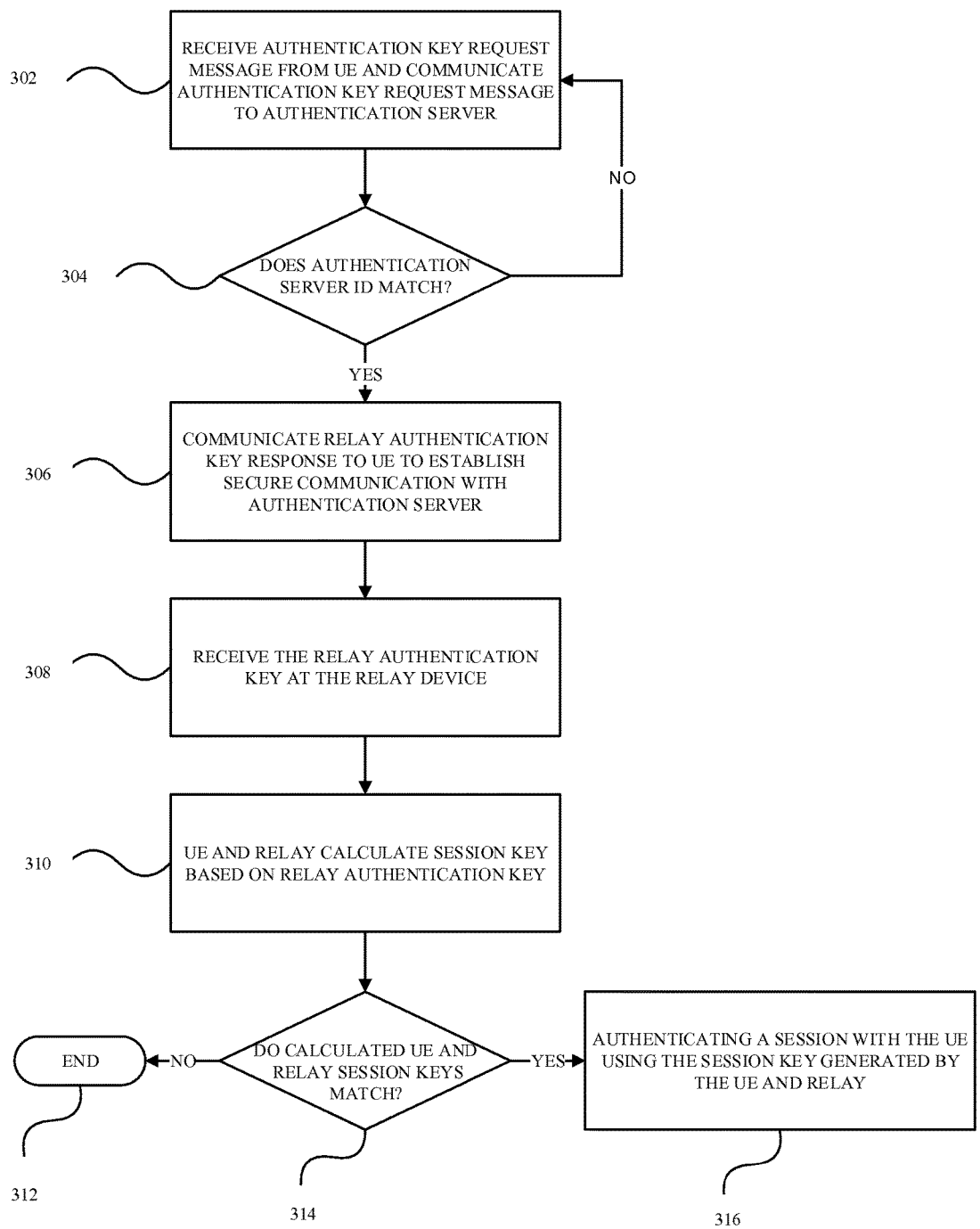
FIG. 3 illustrates an exemplary flow diagram to provision out-of-network user equipment in accordance with FIGS. 1 and 2.

FIG. 3 illustrates an exemplary flow diagram to provision out-of-network user equipment in accordance with FIGS. 1 and 2. With reference to the network architecture in FIG. 2, the user equipment UE 110 sends an authentication key request to authentication server AS, such as an AAA, HLR, HSS, PKMF, etc., via the network relay 205, at 302. The authentication key request may include, for example, the user equipment identity (ID) and the authentication network ID. The user equipment ID is provided to the authentication server AS such that authentication server AS may identify the user equipment UE 110 for further communication (e.g., may respond to the initial request). The authentication server ID enables the network relay 205 to determine which authentication server AS the user equipment UE 110 is attempting to initiate communication. During the authentication key request, the network relay 205, acting for example as an IP router, limits the communication (i.e., IP traffic) between the user equipment UE 110 and the authentication server AS, as no secure communication exists.

At 304, the authentication server AS determines whether authentication server ID sent with the authentication key request matches the ID of the authentication server AS. If the authentication server ID sent with the authentication key request from the user equipment UE 110 does not match, then the process returns to 302. Otherwise, if the authentication server ID sent with the authentication key request matches the ID of the authentication server AS, then the process continues to 306. At 306, the authentication server replies to the authentication key request from the user equipment UE 110 by communicating an authentication key response to the user equipment UE 110 via the network relay 205, and the user equipment UE 110 and authentication server AS establish a secure communication. The secure communication may be established using a standard key exchange protocol, for example TLS, over a standard interface, as defined in 3GPP, such as a PC3 interface. It is appreciated, however, that any known protocol and interface may be used, and that the subject is not limited to the afore-mentioned exemplary embodiments.

The authentication server AS then generates a relay authentication key (shared key) for the user equipment UE 110 to use with the network relay 205 (the shared key between the UE and AS in a conventional system is used to establish security between the user equipment UE 110 and the network—e.g., the eNB in 3GPP), and sends the relay authentication key to the network relay 205 at 308.

At 310, the user equipment UE 110 and the network relay 205 separately calculate a session key based on the relay authentication key provided by the authentication server AS. A determination is made at 312 whether the session key calculated by the user equipment UE 110 and the session key calculated by the network relay 205 match. If the session keys fail to match, then the process ends at 314. If, on the other hand, the session keys match, then the session between the user equipment UE 110 and the network relay 25 is authenticated, and the user equipment UE 110 and the network relay 205 may communicate directly without traffic restriction.

Figure 4:
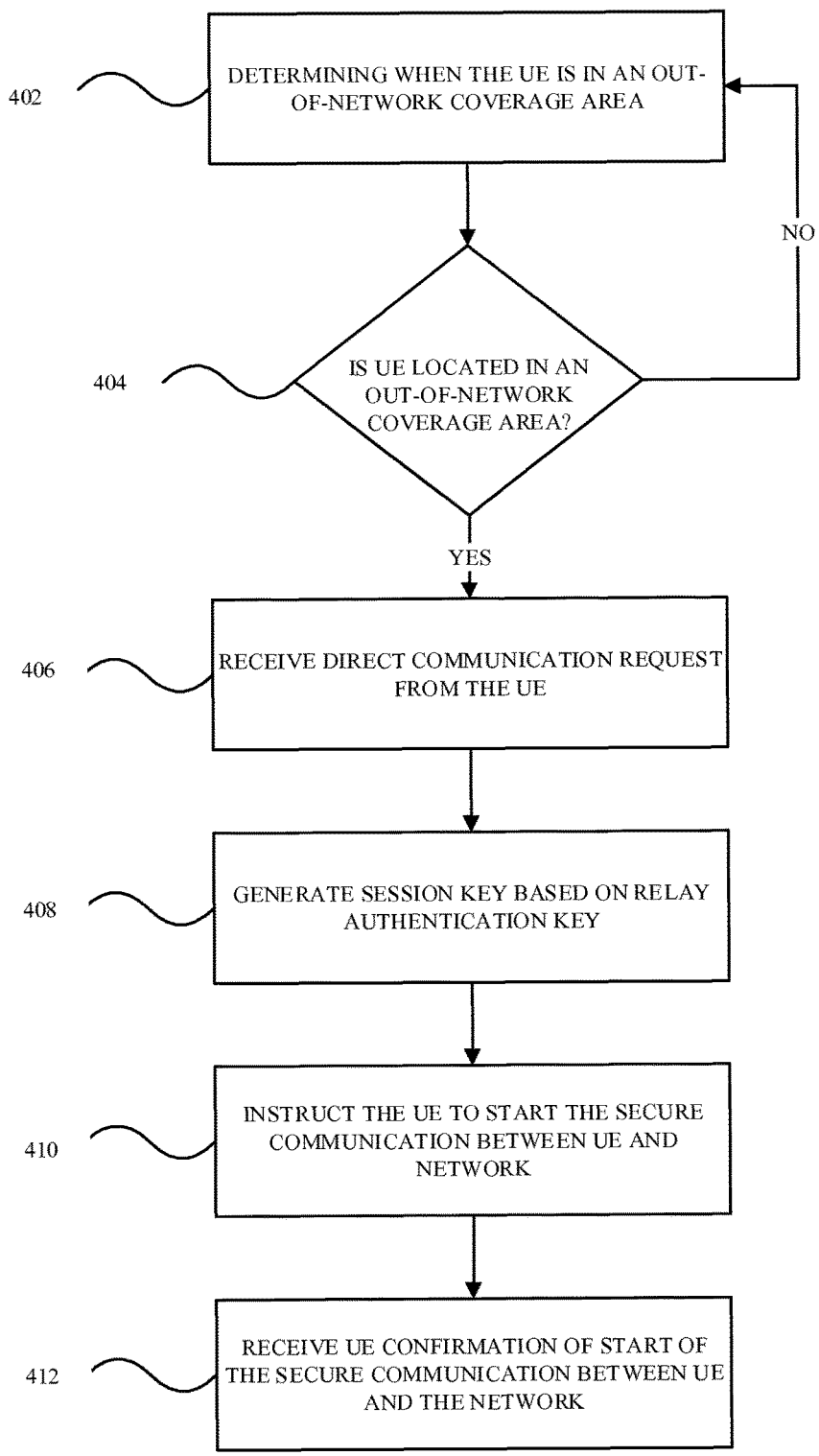
FIG. 4 illustrates an exemplary flow diagram to provision out-of-network user equipment in accordance with FIGS. 1 and 2.

FIG. 4 illustrates an exemplary flow diagram to provision out-of-network user equipment in accordance with FIGS. 1 and 2. At 402, the user equipment UE 110 discovers the network relay 205 using standardized procedures, such as a push or pull of the user equipment UE relay ID or service code. The discovery allows the relay device 205 to determine whether the user equipment UE 110 is located in an out-of-network coverage area 210 (as depicted in FIG. 2).

At 404, if it is determined that the user equipment UE 110 is located in an in-network coverage area, then the process returns to 402. If it is determined that the user equipment UE 110 is located in an out-of-network area 210, then the user equipment UE 110 requests direct communication with the network relay 210 at 406.

At 408, the network relay 205 generates a session key based on the relay authentication key provided by the authentication server AS (similar to 310 above). Once the session key calculated by the network relay 205 is determined to match the session key calculated by the user equipment UE 110 (as described herein above), then network relay 205 instructs the user equipment UE 110 to start secure communication between the user equipment UE 110 and the network at 410. At this time, the network relay 205 can remove the restriction of sending IP traffic to the network. At 412, the user equipment UE 110 confirms the start of the secure communication between the user equipment UE 110 and the network.

Figure 5:
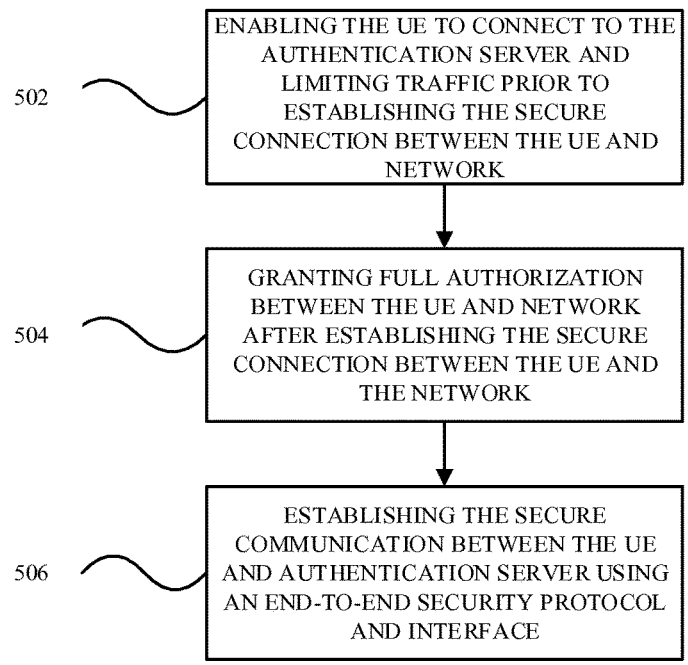
FIG. 5 illustrates an exemplary flow diagram of providing a secure connection with varying connectivity in accordance with FIGS. 3 and 4.

FIG. 5 illustrates an exemplary flow diagram of providing a secure connection with varying connectivity in accordance with FIGS. 3 and 4. As explained above, out-of-network user equipment UE 110 may establish a secure connection to a network relay based on a pre-shared key without having to pre-provision the user equipment UE 110 with the identity and security parameters of the network relay(s). Rather, existing credentials between the user equipment UE 110 and the network are utilized, such that the user equipment UE 110 can establish a secure end-to-end communication with the authentication server (AS) in the network via the network relay(s).

However, prior to establishing the secure connection between the user equipment UE 110 and the network, and since no pre-provisioning exists between the user equipment UE 110 and the network relay 205, the network relay 205 limits the traffic allowed to be sent from the user equipment UE to the authentication server via the network relay 205, at 502. Specifically, the network relay 205 allows the user equipment UE 110 to provide a UE ID and authentication server ID in order to establish such secure communication, without additional (or extremely limited) IP traffic. Once the secure communication has been established between the network and the user equipment UE 110, full authorization of traffic is granted by the network relay 205 between the user equipment UE and the network, at 504. The secure communication that is established between the user equipment UE 110 and the authorization server AS is an end-to-end security protocol, such as TLS, using an interface, such as PC3. The references security protocol and interface are merely exemplary in nature, and any well-known security protocol and interface may be used to implement the secure communication.

Figure 6:
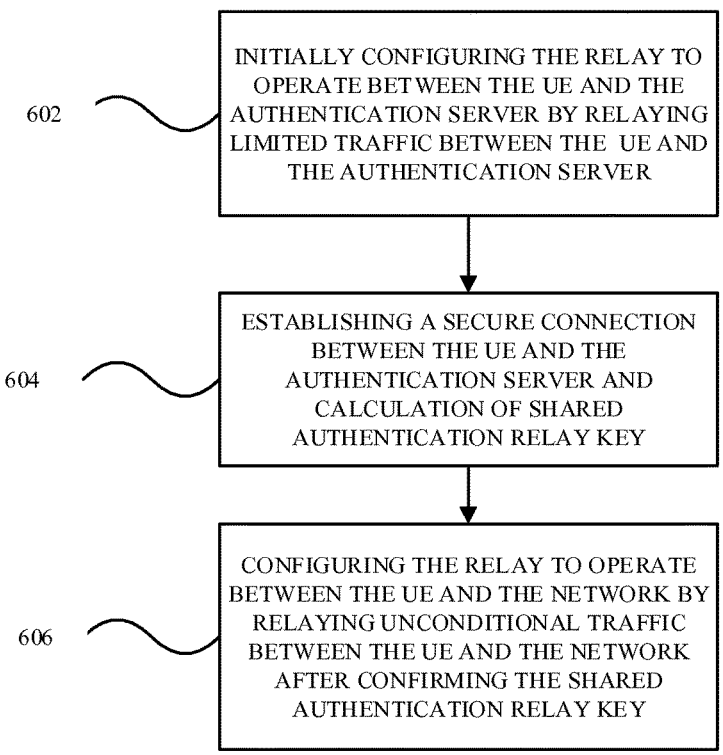
FIG. 6 illustrates an exemplary flow diagram of configuring a network relay in accordance with FIG. 2.

FIG. 6 illustrates an exemplary flow diagram of configuring a network relay in accordance with FIG. 2. In one exemplary embodiment, the network relay 205 is an IP router that promotes the flow of IP traffic between the user equipment UE 110 and the authentication server AS. However, as noted above, there is no requirement that any provisioning exist between the user equipment UE 110 and the network relay 205 in order for the user equipment UE 110 to be authenticated on the network.

As depicted in FIG. 2, the network relay 205 is initially configured to operate between the user equipment UE 110 and the authentication server AS by relaying a limited amount of traffic between the user equipment UE 110 and the authentication server AS at 602. While the network relay 205 is configured in its initial configuration, a secure connection may be established between the user equipment UE 110 and the authentication server AS, along with calculation of a shared authentication relay key (a shared key) at 604.

After securing communication and confirming the shared authentication relay key, the network relay 205 may then be configured to operate between the user equipment UE 110 and the network by relaying unconditional traffic between the user equipment UE 110 and the network at 606.

Figure 7:
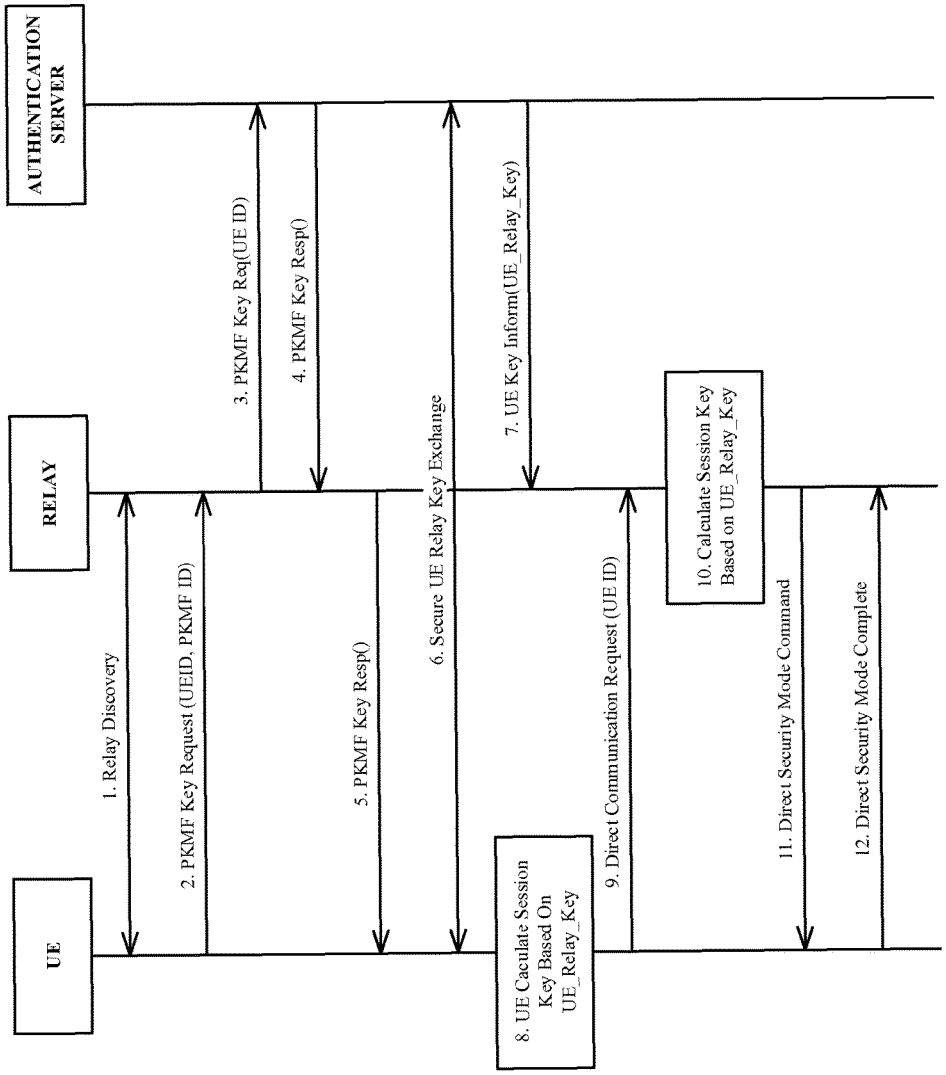
FIG. 7 illustrates an exemplary flow diagram of provisioning the out-of-network user equipment in accordance with FIGS. 2-5.

FIG. 7 illustrates an exemplary flow diagram of provisioning the out-of-network user equipment in accordance with FIGS. 2-5. The call flow illustrated in the figure relates to provisioning out-of-network user equipment UE 110 by establishing an end-to-end secure communication with the authentication server AS in the network via a network relay 205. The following flow diagram describes such provisioning. Initially, the user equipment UE 110 discovers the network relay 205 using well-known techniques, such as a push or pull of user equipment UE Relay ID or a service code).

The user equipment UE 110 then sends an authentication key request message to authentication server AS via the network relay 205. The network relay 205, such as an IP router, limits traffic to the authentication server AS (e.g., home operator), and otherwise prohibits IP traffic since the user equipment UE 110 has not been authenticated and a secure link does not exist. Subsequently, the authentication server responds to the authentication key request to the network relay 205, and the network relay 205 forwards the authentication key response to the user equipment UE 110.

The user equipment UE 110 and authentication server AS then establish a secure communication using, for example, a standard security protocol. Additionally, a user equipment-to-authentication server interface may be used as part of the communication mechanism, such as a standard interface defined in 3GPP, and a shared key is generated for the user equipment UE 110 to use with the network relay 205. Significantly, the user equipment UE 110 and the authentication server AS share a key (secret) that is conventionally used to establish security between the user equipment UE 110 and the network (e.g., eNB in 3GPP). Subsequently, the authentication server AS sends a user equipment relay key (e.g., UE_Relay_Key) to the network relay 205, and the user equipment UE 110, having the user equipment relay key, generates a session key to authenticate and protect the session between the user equipment UE 110 and the network relay 205.

Once the session key is used to authenticate the session between the user equipment UE 110 and the network relay 205, the user equipment UE 110 requests a direct communication with the network relay 205, and the network relay 205 generates a session key using the user equipment relay key (UE_Relay_Key). The network relay 205 informs the user equipment UE 110 to start a secure communication, the network relay 205 removes the restriction of sending IP traffic to the network and the user equipment UE 110 confirms the start of the secure communication.

Figure 8:
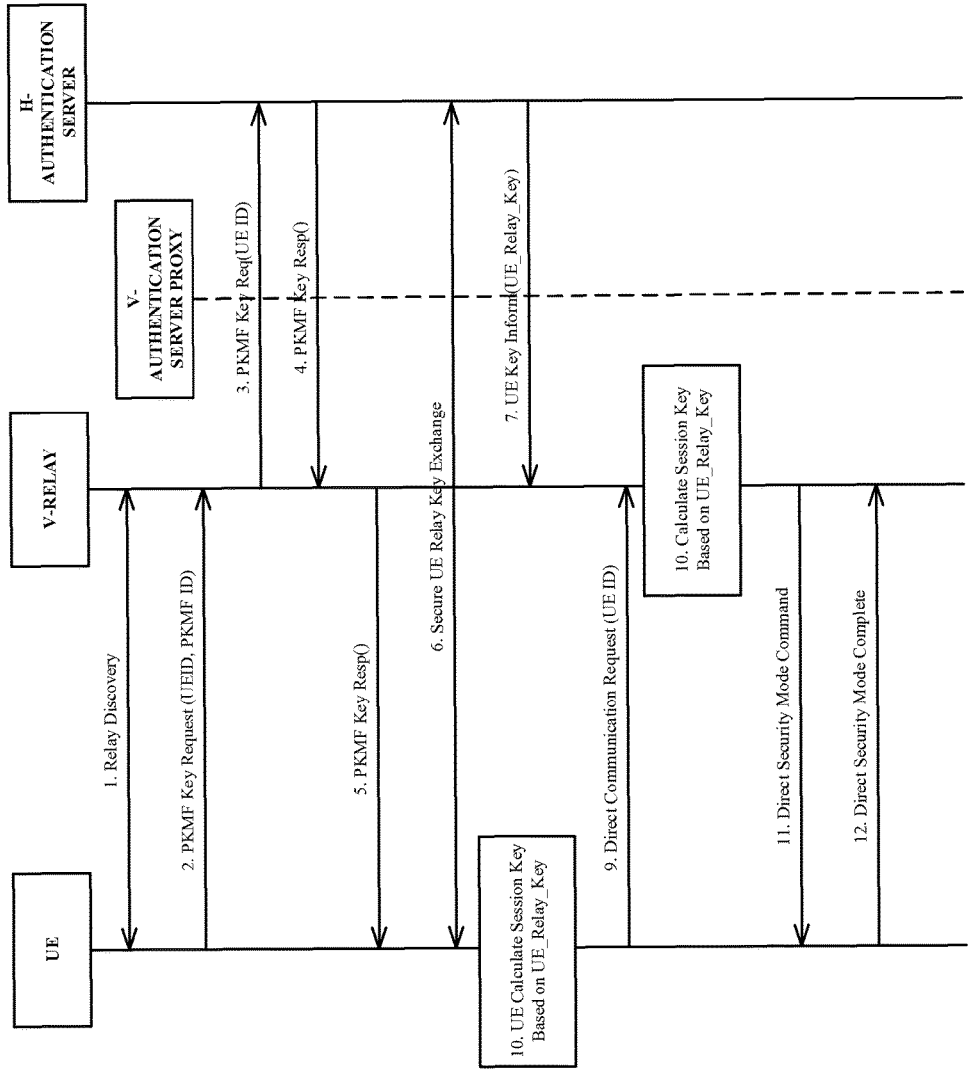
FIG. 8 illustrates an exemplary flow diagram of roaming user equipment in accordance with FIG. 2.

FIG. 8 illustrates an exemplary flow diagram of roaming user equipment in accordance with FIG. 2. The flow diagram in FIG. 8 is similar to the flow diagram in FIG. 7, and is not repeated herein. However, the flow diagram of FIG. 8 distinguishes over the flow diagram of FIG. 7 in that it relates to user equipment UE that is roaming.

Roaming is a well-known mechanism that allows a mobile user to extend connectivity service when located under coverage of a network that is different from the home network with which there is a subscription. Roaming is provided, for example, in the Evolved Packet System (EPS) system defined by the $3^{rd}$ Generation Partnership Project (3GPP). In this case, it allows a User Equipment (UE) to extend connectivity service under coverage of a 3GPP access network that is different from the home 3GPP network.

In the exemplary embodiment, the roaming user equipment UE 110 has visited a network (the V-network), in which visited relay (V-relay) and a visited authentication server AS (V-authentication server AS) proxy belong. In the visited network, the V-AS proxy is located between the V-relay and the home (H) authentication server AS (H-AS). However, the user equipment UE 110 remains connected to the H-authentication server AS. While the user equipment UE 110 remains roaming in the V-network, the V-relay will allow IP traffic to the proxy. Thereinafter, the proxy checks the destination of the user equipment's UE's request to determine whether to forward it. If the destination IP address belongs to one of the roaming partners, the V-proxy will forward the request to the H-AS. Otherwise, the call flow is similar to that described above with respect to FIG. 7, and not repeated herein.

Figure 9:
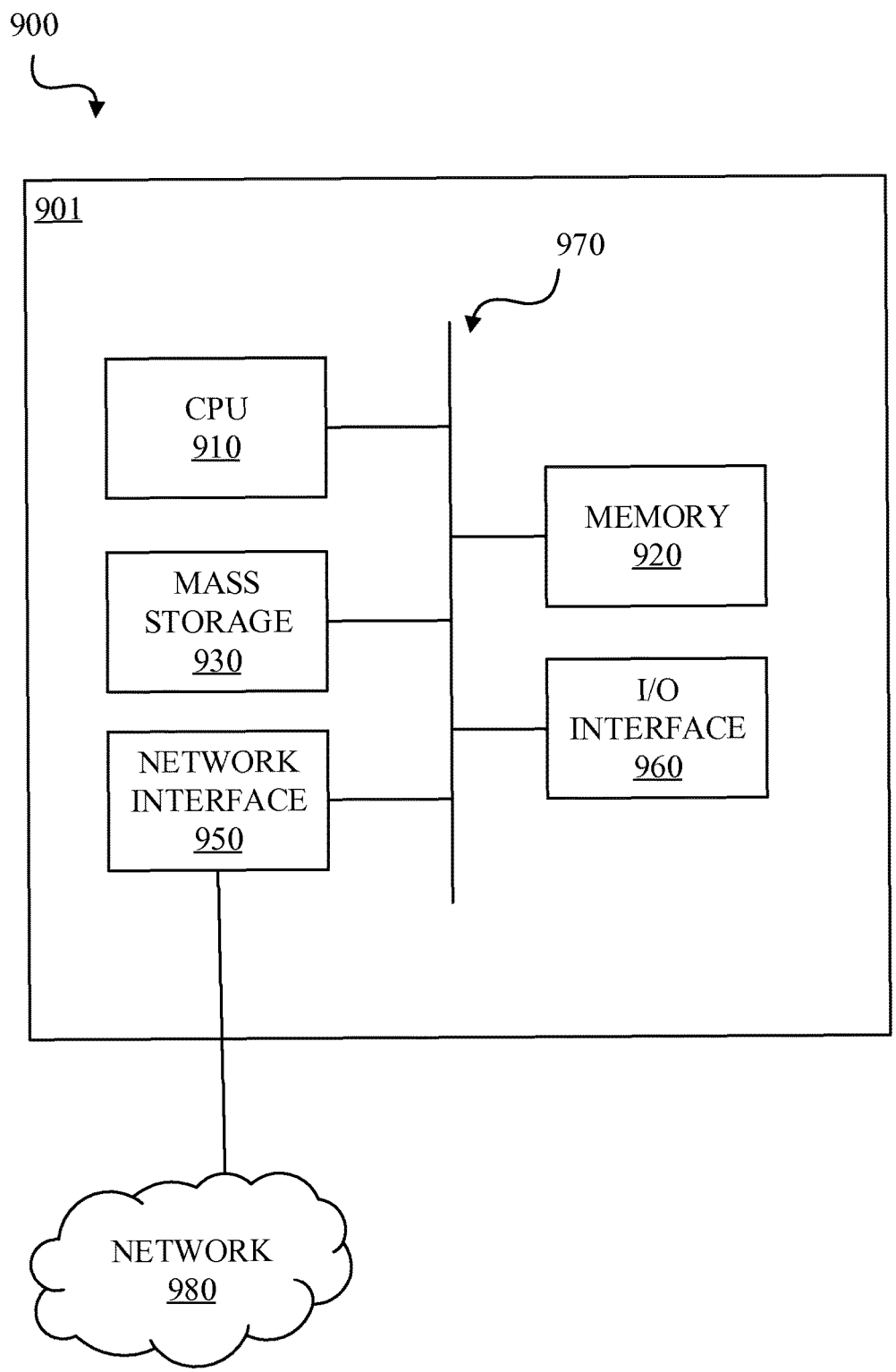
FIG. 9 is a block diagram of a network system that can be used to implement various embodiments.

FIG. 9 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 901 equipped with one or more input/output devices, such as network interfaces, storage interfaces, and the like. The processing unit 901 may include a central processing unit (CPU) 910, a memory 920, a mass storage device 930, and an I/O interface 960 connected to a bus. The bus may be one or more of any type of several bus architectures including a memory bus or memory controller, a peripheral bus or the like.

The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. In embodiments, the memory 920 is non-transitory. The mass storage device 930 may comprise any type of storage device configured to store data, programs, and other information and to make the data, programs, and other information accessible via the bus. The mass storage device 930 may comprise, for example, one or more of a solid state drive, hard disk drive, a magnetic disk drive, an optical disk drive, or the like.

The processing unit 901 also includes one or more network interfaces 950, which may comprise wired links, such as an Ethernet cable or the like, and/or wireless links to access nodes or one or more networks 980. The network interface 950 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for provisioning out-of-network user equipment in a network, comprising:
  receiving, via a network relay device, an authentication key request message from a user equipment including a user equipment identity and an authentication server identity, and communicating the authentication key request message to an authentication server in the network having the authentication server identity;
restricting IP traffic from the user equipment to the authentication server, by the network relay device, until the user equipment establishes a secure communication with the authentication server;
communicating, via the network relay device, a relay authentication key response received from the authentication server to the user equipment such that the secure communication is established between the user equipment and the authentication server;
receiving, via the network relay device, a relay authentication key generated during establishment of the secure communication between the user equipment and the authentication server; and
authenticating, via the network relay device, a session with the user equipment using a session key generated by the user equipment based on the relay authentication key and provisioning the user equipment based on the authenticated session.

2. The method of claim 1, further comprising:
determining, via the network relay device, when the user equipment is in an out-of-network coverage area;
in response to determining that the user equipment is in the out-of-network coverage area, the network relay device:
receiving a direct communication request from the user equipment including the authenticated user equipment identity;
generating the session key based on the relay authentication key;
instructing the user equipment to start the secure communication between the user equipment and the authentication server; and
receiving confirmation of the start of the secure communication from the user equipment.

3. The method of claim 2, wherein the user equipment discovers the network relay device in the out-of-network coverage area in advance of sending the authentication key request.

4. The method of claim 1, wherein the secure connection between the user equipment and the authentication server is established using an end-to-end connection.

5. The method of claim 1, wherein, prior to establishing the secure connection between the user equipment and the network, enabling the user equipment to connect to the authentication server and prohibiting other IP traffic communication from the user equipment.

6. The method of claim 5, wherein, after establishing the secure connection between the user equipment and the authentication server, granting full authorization between the user equipment and the network.

7. The method of claim 6, wherein the secure communication between the user equipment and the authentication server is established using an end-to-end security protocol and an interface to the authentication server to generate the relay authentication key between the user equipment and the network relay device.

8. The method of claim 1, wherein the authentication server is one of an authentication, authorization and accounting (AAA) server, a home location register (HLR) server, home subscriber server (HSS) and a public regulated service key management facility (PKMF) server.

9. The method of claim 1, wherein the determining that the user equipment is in the out-of-network coverage area includes determining that the user equipment was previously in an in-network coverage area.

10. The method of claim 1, wherein the authentication server identity is pre-defined.

11. A network relay device, comprising:
a receiver receiving an authentication key request message from a user equipment including a user equipment identity and an authentication server identity, and communicating the authentication key request message to an authentication server in a network having the authentication server identity;
a transmitter communicating a relay authentication key response received from the authentication server to the user equipment such that a secure communication is established between the user equipment and the authentication server;
the receiver receiving a relay authentication key generated during establishment of the secure communication between the user equipment and the authentication server; and
a processor operatively coupled to the transmitter and to the receiver and including a non-transitory computer-readable storage device comprising instructions which cause the processor to authenticate a session with the user equipment using a session key generated by the user equipment based on the relay authentication key and provisioning the user equipment based on the authentication session, wherein
prior to establishing the secure connection between the user equipment and the authentication server, the network relay device enables the user equipment to connect to the authentication server and prohibits IP traffic communication from the user equipment.

12. The network relay device of claim 11, wherein the processor further comprises instructions which cause the processor to:
determine when the user equipment is in an out-of-network coverage area; and
in response to determining that the user equipment is in the out-of-network coverage area,
receive a direct communication request from the user equipment including the authenticated user equipment identity;
generate the session key based on the relay authentication key;
instruct the user equipment to start the secure communication between the user equipment and the authentication server; and
receive confirmation of the start of the secure communication from the user equipment.

13. The network relay device of claim 12, wherein the user equipment discovers the network relay device in the out-of-network coverage area in advance of sending the authentication key request.

14. The network relay device of claim 11, wherein the network relay device is an IP router that restricts IP traffic from the user equipment to the authentication server until the user equipment establishes the secure communication with the authentication server.

15. The network relay device of claim 11, wherein the secure connection between the user equipment and the authentication server is established using an end-to-end connection.

16. The network relay device of claim 11, wherein, after establishing the secure connection between the user equipment and the authentication server, the network relay device grants full authorization between the user equipment and the network.

17. The network relay device of claim 16, wherein the secure communication between the user equipment and the authentication server is established using an end-to-end security protocol and an interface to the authentication server to generate the relay authentication key between the user equipment and the network relay device.

18. The network relay device of claim 11, wherein the authentication server is one of an authentication, authorization and accounting (AAA) server, a home location register (HLR) server, home subscriber server (HSS) and a public regulated service key management facility (PKMF) server.

19. The network relay device of claim 11, wherein the determining that the user equipment is in the out-of-network coverage area includes determining that the user equipment was previously in an in-network coverage area.

20. The network relay device of claim 11, wherein the authentication server identity is pre-defined.

21. The network relay device of claim 18, further comprising:
when the user equipment is roaming in another network, the network relay device communicates IP traffic to a proxy authentication server, wherein the proxy authentication server checks a destination address included in the user equipment authentication key request message; and
when the destination address matches an address of the authentication server,
the network relay device forwards the authentication key request message to the authentication server via the authentication proxy server.

* * * * *